(12) United States Patent
Melikian

(10) Patent No.: US 9,702,694 B2
(45) Date of Patent: Jul. 11, 2017

(54) WHEEL TOE AND CAMBER MEASUREMENT SYSTEM

(71) Applicant: Recognition Robotics, Inc., Elyria, OH (US)

(72) Inventor: Simon Melikian, Westlake, OH (US)

(73) Assignee: Recognition Robotics, Inc., Elyria, OH (US)

(*) Notice: Subject to any disclaimer, the term of this patent is extended or adjusted under 35 U.S.C. 154(b) by 369 days.

(21) Appl. No.: 14/299,020

(22) Filed: Jun. 9, 2014

(65) Prior Publication Data

US 2015/0354946 A1 Dec. 10, 2015

(51) Int. Cl.
*G01B 11/26* (2006.01)
*G01B 11/275* (2006.01)

(52) U.S. Cl.
CPC ...... *G01B 11/2755* (2013.01); *G01B 2210/14* (2013.01); *G01B 2210/22* (2013.01); *G01B 2210/26* (2013.01)

(58) Field of Classification Search
CPC ............ G01B 2210/14; G01B 2210/22; G01B 11/2755; G01B 11/275
USPC .................................................. 356/139.09
See application file for complete search history.

(56) References Cited

U.S. PATENT DOCUMENTS

| 5,978,077 A * | 11/1999 | Koerner | G01B 11/275 33/203.16 |
| 6,894,771 B1 | 5/2005 | Dorrance et al. | |
| 8,836,764 B2 * | 9/2014 | Gruetzmann | G01B 11/275 348/46 |
| 2007/0081147 A1 | 4/2007 | Van Den Bossch | |
| 2012/0092654 A1 * | 4/2012 | De Sloovere | G01B 11/25 356/139.09 |

FOREIGN PATENT DOCUMENTS

DE  2948573  6/1981

* cited by examiner

*Primary Examiner* — Mark Hellner
(74) *Attorney, Agent, or Firm* — Rankin, Hill & Clark LLP

(57) ABSTRACT

A system for measuring wheel alignment includes at least one camera and at least one processor in communication with the camera. The camera captures an image of a test wheel. The processor processes the captured image to measure the wheel alignment.

13 Claims, 4 Drawing Sheets

WHEEL TOE AND CAMBER MEASUREMENT SYSTEM

BACKGROUND

Non-contact vehicle wheel alignment measuring systems either use (1) structured light (i.e., light sources able to project a line of light onto the wheel) or (2) non-structured light. While structured light typically does not require the use of optical targets, the linear light projected onto the wheel can be a concern to operators of the vehicle alignment measuring system and their employers. Non-contact wheel alignment measuring systems that use non-structured light typically require optical targets, which are separate from the wheel and are mounted to the wheel.

In a non-structured light system, the separate optical targets are secured to vehicle wheels with wheel adaptors that clamp onto the wheel and position a mounting point for the wheel adaptors substantially coaxial with the axis of rotation of the wheel rim. A conventional optical target includes precisely engineered high-contrast optical elements such as circles, squares, or triangles. In one known system, the optical elements must be large enough to have relatively long straight or curved boundaries, and they must be separated far enough to prevent the individual optical elements from appearing to fuse into a single object when reduced edge sharpness causes two or more optical elements to bleed into the same pixel in the imaging system.

SUMMARY

A method for measuring wheel alignment that can be used in non-structured light and does not require the conventional optical target described above will be described. The method includes using at least one camera to obtain at least one image of a test wheel that rotates about a z-axis. The method also includes using at least one processor, which is in communication with the at least one camera, to locate an outer curve in the at least one image based on a difference of reflectivity on surfaces of the test wheel. The method further includes using the at least one processor to locate the perspective center for the outer curve. The method also includes using the at least one processor to locate the z-axis. The z-axis can be located based on an image of a self-centering target attached to the test wheel. Alternatively, the z-axis can located by locating the center of an inner curve in the at least one image. The inner curve is smaller than and bounded by the outer curve. The inner curve is also located based on a difference of reflectivity on the surfaces of the test wheel. The method can further include using the at least one processor to determine a wheel alignment for the test wheel based on comparing the perspective center with the z-axis.

A system for measuring wheel alignment that can be used in non-structured light and does not require the conventional optical target described above includes at least one camera and at least one processor. The at least one camera mounts to a frame offset from a surface upon which an associated vehicle wheel rotates about a z-axis. The at least one camera captures at least one image of the associated test wheel. The at least one processor is in communication with the camera, and is configured to locate an outer curve in the at least one image based on a difference of reflectivity on surfaces of the test wheel, to locate a perspective center for the outer curve, to locate the z-axis in the at least one images, and to measure Rx and Ry for the associated vehicle wheel based on comparing the perspective center to the z-axis.

DETAILED DESCRIPTION

Figure 1:
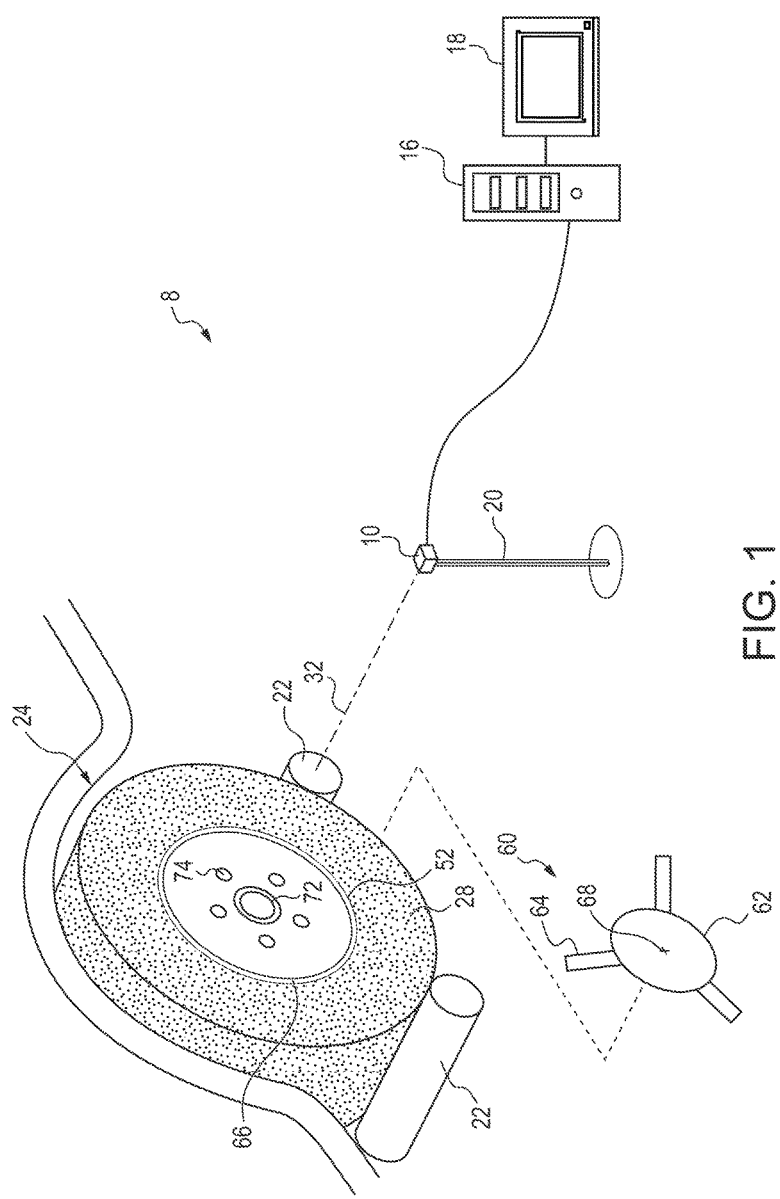
FIG. 1 is a schematic depiction of a wheel alignment measuring system and a test wheel.
Figure 2:
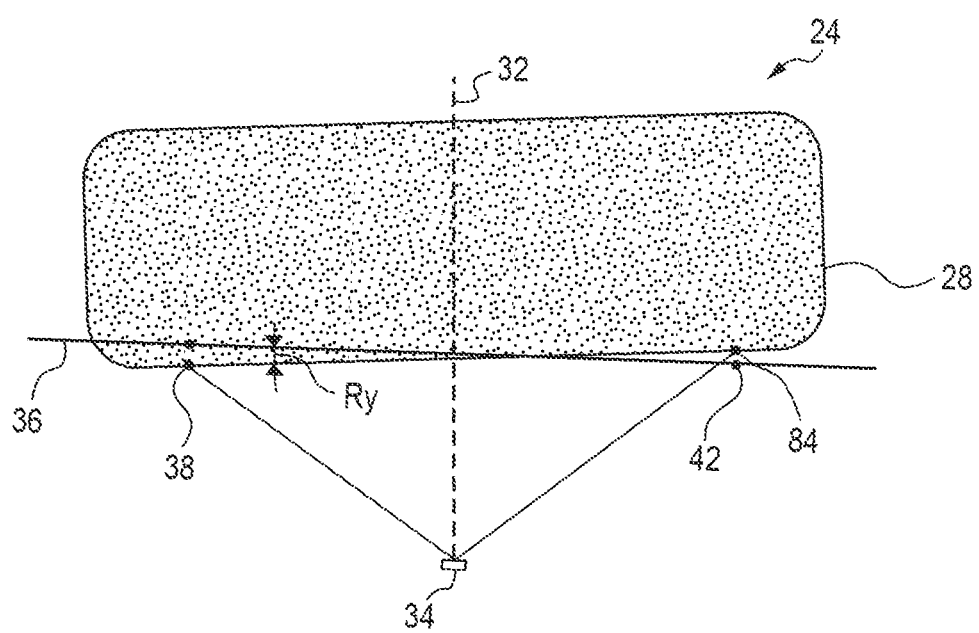
FIG. 2 is a top view of the wheel, which is out of alignment, and an optical sensor of the camera of the wheel alignment measuring system of FIG. 1.

With reference to FIG. 1, a non-contact wheel alignment system 8 includes a camera 10 in communication with a processor 16, which is connected with a display 18. In FIG. 1, only one camera and one processor are shown, but the system could include more cameras or more processors. With reference back to the illustrated embodiment, the camera 10 mounts to a frame 20. The frame 20 fixes the location of the camera 10 with respect to rollers 22. The rollers 22 provide a surface upon which a test wheel 24, which includes a wheel rim 26 and a tire 28, rotates about a z-axis 32 so that its wheel alignment can be tested. Other mechanisms could be provided to support the test wheel 24 and provide a surface upon which the test wheel 24 can rotate. The system 8 measures the wheel alignment, e.g., toe and camber, of the wheel 24, which is typically connected with an axle (not visible) of a vehicle (only a portion of which is shown in FIG. 1). FIG. 2 depicts the test wheel 24 out of alignment. The magnitude and direction of the misalignment can be detected and measured using the system 8.

Figure 3:
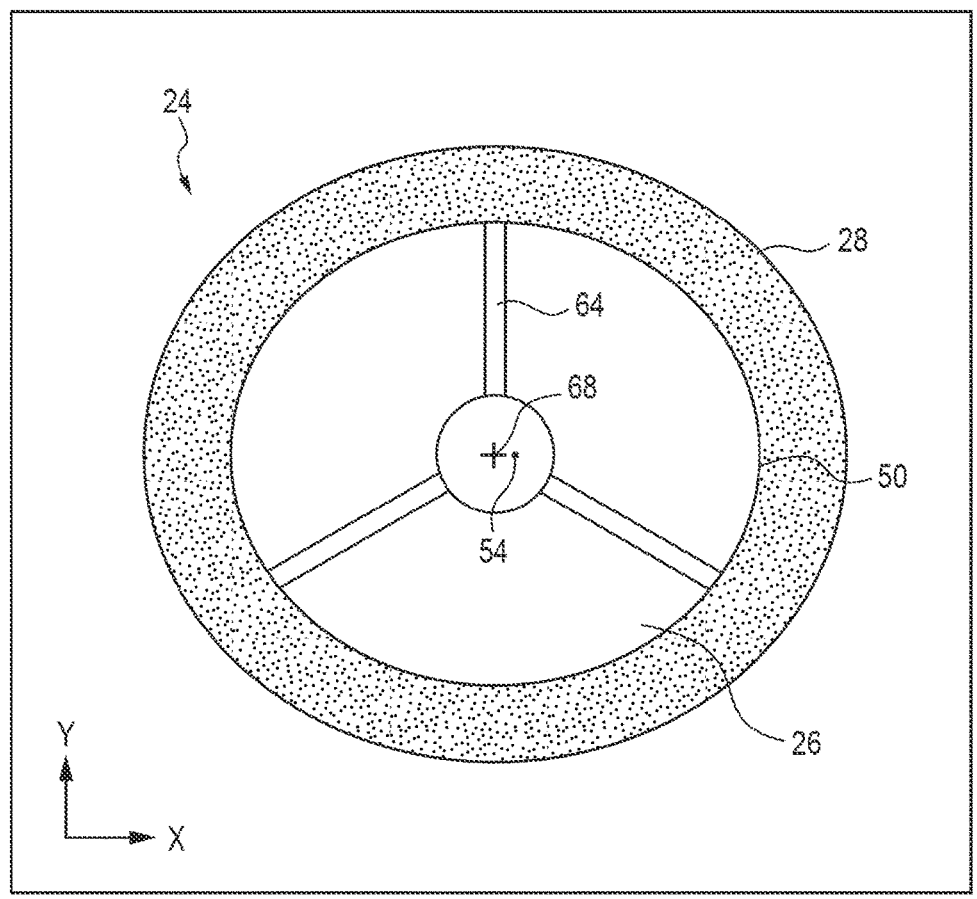
FIG. 3 depicts a test image obtained by the camera of the wheel alignment measuring system of FIG. 1 with a self centering target attached to the test wheel.
Figure 4:
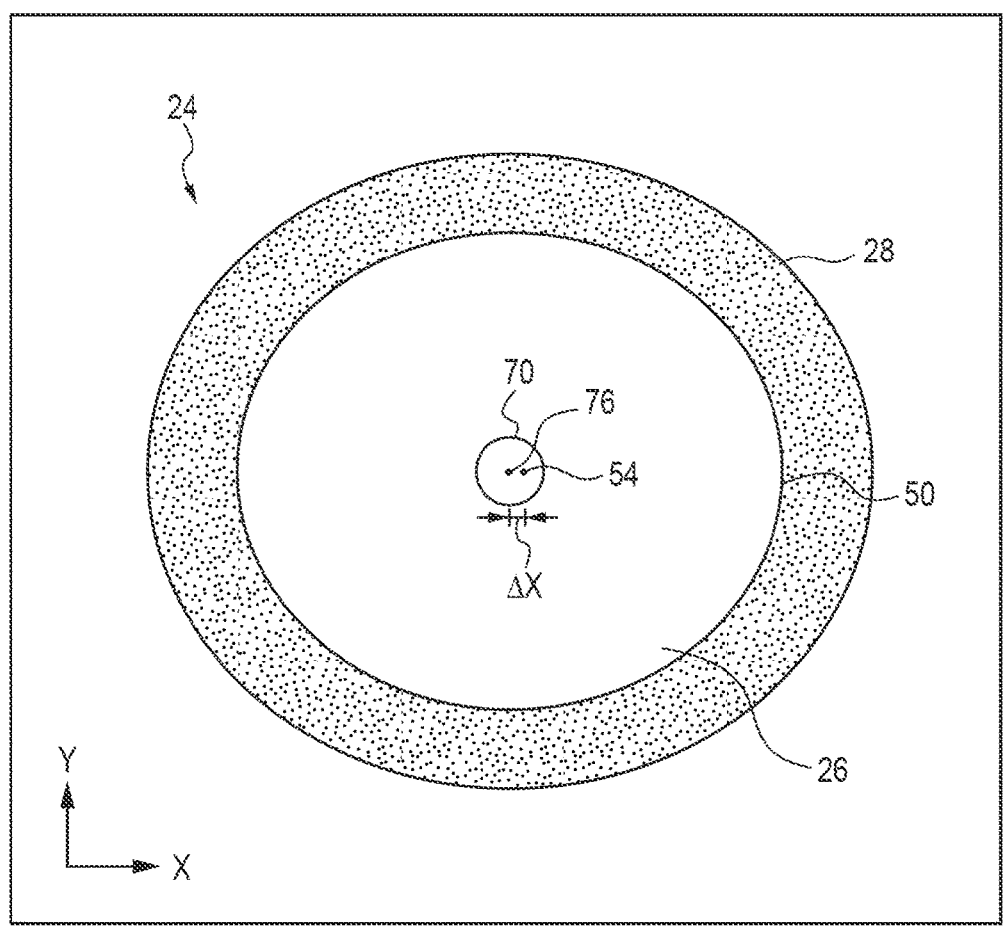
FIG. 4 depicts another test image obtained by the camera of the wheel alignment measuring system of FIG. 1.

With reference to FIG. 2, an optical sensor 34 of the camera 10 (not shown in FIG. 2) obtains at least one image of the test wheel 24 to measure and detect wheel alignment. Examples of such images, which can be shown on the display 18, are shown in FIGS. 3 and 4. The optical sensor 34 can be a conventional CCD planar array. In the illustrated embodiment, the optical sensor 34 is normal to the z-axis 32. This is not necessary, but it does simplify the calculations. The camera 10 mounts in a known location on the frame 20 with respect to the rollers 22. The wheel alignment system 8 obviates the need for structured light, which is used in many wheel alignment systems, by the use of a program running on the processor 16, which can be used to detect certain locations on the test wheel 24. The wheel alignment system 8 also obviates the need for the conventional optical target having precisely engineered high-contrast optical elements such as circles, squares, or triangles.

FIG. 2 shows a top view of the test wheel 24. The test wheel 24 is offset from the x-y plane 36, which is normal to the z-axis 32. If the wheel 24 depicted in FIG. 2 was aligned with the x-y plane 36, then the test wheel 24 would have perfect toe. The system 8, can measure the offset of the test wheel 24 from perfect toe. Since the test wheel 24 is offset from the x-y plane 36 and oriented as shown in FIG. 2, one side of the test wheel 24 (e.g., point 38 in FIG. 2) is closer in the z-direction to the optical sensor 34 as compared to the other side (e.g., point 42 in FIG. 2).

The program on the processor 16 locates a curve or curves in the at least one image that was captured by the camera 10. The curves are located based on a difference of reflectivity on surfaces of the test wheel 24. With reference to FIG. 3, the processor 16 can be programmed to locate an outer curve 50 (FIG. 3) that coincides with an intersection 52 (FIG. 1) of the wheel rim 26 and the tire 28 of the test wheel 24. The outer curve 50 can be located using the program running on the processor 16 due to the difference in reflectivity of the tire 28 as compared to the wheel rim 26. The program running on the processor 16 can assign gray-scale values to each pixel in the image captured by the camera 10. Since the reflectivity between the tire 28, which is made of rubber, and the rim 26, which is made of metal, greatly differ, the intersection of these two components can be easily located within the image. U.S. Pat. No. 8,150,165 B2, which is incorporated by reference herein, discloses a computer program capable of detecting objects within a digital image. Such a program can run on the processor 16 to detect the outer curve 50.

A circle in physical space appears as an ellipse on the image plane, except when viewed normal to the plane in which it resides. Since the test wheel 24 is offset from the x-y plane 36, the outer curve 50, which is defined by the intersection 52 of the wheel rim 26 and the tire 28 of the test wheel 24, will appear as an ellipse in the image captured by the camera 10 instead of a circle. In FIG. 2, the plane in which the "circle" defined by the intersection 52 (see FIG. 1) of the wheel rim 26 and the tire 28 is rotated about the y-axis a value Ry from the x-y plane 36. The value Ry relates to the offset of the test wheel 24 from perfect toe. The program running on the processor 16 also locates the center, which is the perspective center 54, of the outer curve 50. Locating the perspective center 54 of the outer curve 50 can be accomplished by methods known in the art. The "circle" defined by the intersection of the wheel rim 26 and the tire 28 of the test wheel 24 would have its perspective center aligned with the z-axis if the wheel 24 was perfectly aligned—as opposed to the orientation shown in FIG. 2. The distance that the perspective center 54 of the outer curve 50 is offset from the z-axis 32 is a function of Ry, and vice versa.

The processor 16 is also configured to locate the z-axis 32 in the image that was captured by the camera 10. Two alternative methods for locating the z-axis 32 will be explained. Either method can be used.

The system 8 for measuring wheel alignment can include a wheel adapter 60 (schematically depicted in FIG. 1) having a self-centering target 62. The self-centering target 62 can be part of the wheel adaptor 60, which can include contact supports 64 and a centering mechanism (not visible) for symmetrically engaging a circumferential lip 66 of the wheel rim 26 of the test wheel 24. The contact supports 64 and the centering mechanism cooperate to secure the wheel adaptor 60 in an axially centered position on the test wheel 24. A wheel adaptor including a centering mechanism is known in the art; however, these known wheel adaptors typically include the precisely engineered high-contrast optical elements such as circles, squares, or triangles attached to the wheel adaptor. In contrast, the self-centering target 62 connects with the wheel adaptor 60 and includes a point (depicted as cross hairs 68 in FIG. 1) on the self-centering target 62 for aligning with the axially centered position on the test wheel 24. When properly attached with the test wheel 24, the cross hairs 68 align with the z-axis 32. The software on the processor 16 is configured to locate the intersection of the cross hairs 68, which will align with the z-axis 32, using the program disclosed in U.S. Pat. No. 8,150,165 B2, for example.

Another manner in which to locate the z-axis 32 is by locating an inner curve 70 (FIG. 4) in the image obtained by the camera 10. With reference back to FIG. 1, the wheel 24 includes a centrally-located opening 72 in the wheel rim 26. The centrally-located opening 72 is surrounded by a plurality of bolt holes 74, which receive bolts to connect the test wheel 24 with the axle of the vehicle. The program running on the processor 16 can locate the centrally-located opening 72 based on a difference of reflectivity on surfaces of the test wheel 24 (although the bolt holes 74 would be visible in the image in FIG. 4, they are not shown for purposes of clarity). The inner curve 70 located by the program running on the processor 16 can coincide with the centrally-located opening 72. The inner curve 70 is a circle (or an ellipse having foci so close together that it can be considered a circle) even when the test wheel 24 is out of alignment, such as that shown in FIG. 2. As seen when referring back to FIG. 2, the centrally-located opening 72 is close enough to the z-axis 32 that there is only a very slight difference in the z-direction from one side of the wheel 24 (e.g., to the left of the z-axis 32 in FIG. 2) to the optical sensor 34 as compared to the other side (e.g., to the right of the z-axis 32 in FIG. 2). As such, the center 76 of the inner curve 70, either the physical center or the perspective center, which can be determined using known methods, will coincide with the z-axis 32. Other circular structures on the test wheel 24 could be used to generate the inner curve 70. The centrally-located opening 72 was chosen because of the high contract between the wheel rim 26 and the opening. The location chosen for the inner curve 70 is to be concentric with the z-axis 32 and relatively close to the z-axis so that the inner curve is still a circle (or very close to a circle) in the image even if the test wheel 24 is not perfectly aligned.

Now that the location of the z-axis 32 is known, the perspective center 54 of the outer curve 50 can be compared to the z-axis 32. For example in FIG. 4, the perspective center 54 of the outer curve 50 is offset Δx to the right of the z-axis 32, which can denote −Ry. The perspective center 54 of the outer curve 50 is offset to the left of the z-axis can denote +Ry. Ry can be determined based on knowing the pixel size for the optical sensor 34 and the distance between the optical sensor 34 and the x-y plane 36.

FIGS. 1-4 and the description above explain how the system is used to measure the toe of the test wheel 24, which is a function of Ry. The test wheel 24 may be rotated about the x-axis a value Rx, which relates to camber. The program running on the processor 16 can determine Rx in a manner similar to how Ry was determined.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for measuring wheel alignment comprising:
using at least one camera to obtain at least one image of a test wheel that rotates about a z-axis;
using at least one processor in communication with the at least one camera to locate an outer curve in the at least one image based on a difference of reflectivity on surfaces of the test wheel;
using the at least one processor to locate a perspective center for the outer curve;

using the at least one processor to locate the z-axis, wherein the z-axis is located based on an image of a self-centering target attached to the test wheel or an inner curve in the at least one image that is smaller than and bounded by the outer curve, wherein the inner curve is located based on a difference of reflectivity on the surfaces of the test wheel; and using the at least one processor to determine a wheel alignment for the test wheel based on comparing the perspective center with the z-axis.

2. The method of claim 1, wherein the outer curve coincides with an interface of a wheel rim and a tire of the test wheel.

3. The method of claim 1, wherein the outer curve is an ellipse when the test wheel is out of alignment.

4. The method of claim 1, wherein the inner curve is a circle having a center at the z-axis.

5. The method of claim 4, wherein the inner curve coincides with an inner opening in a wheel rim of the test wheel, wherein the inner opening is surrounded by bolt holes for attaching the wheel to an axle.

6. The method of claim 1, wherein the self-centering target is attached to a wheel adaptor including contact supports and a centering mechanism for symmetrically engaging a circumferential lip of a wheel rim of the test wheel and securing the wheel adaptor in an axially centered position on the test wheel, and the self-centering target includes a point for aligning with the axially centered position on the test wheel, which coincides with the z-axis.

7. The method of claim 1, wherein a direction in which the perspective center is offset from the z-axis determines a direction of wheel alignment.

8. A system for measuring wheel alignment comprising:
at least one camera mounted to a frame offset from a surface upon which a test wheel rotates about a z-axis, wherein the at least one camera captures at least one image of the test wheel; and
at least one processor in communication with the camera, the at least one processor being configured
to locate an outer curve in the at least one image based on a difference of reflectivity on surfaces of the test wheel;
to locate a perspective center for the outer curve;
to locate the z-axis in the at least one image; and
to measure Rx and Ry for the test wheel based on comparing the perspective center to the z-axis, and
a self-centering target for attaching to the test wheel, the self-centering target being part of a wheel adaptor, which includes contact supports and a centering mechanism for symmetrically engaging a circumferential lip of a wheel rim of the test wheel and securing the wheel adaptor in an axially centered position on the test wheel, and the self-centering target includes a point for aligning with the axially centered position on the test wheel.

9. The system of claim 8, wherein the processor is configured to locate an interface of a wheel rim and a tire of the test wheel, and the outer curve coincides with the interface of the wheel rim and the tire.

10. The system of claim 9, wherein the outer curve is an ellipse when the test wheel is out of alignment.

11. The system of claim 8, wherein the processor is configured to locate the point on the self-centering target, wherein the point coincides with the z-axis.

12. A system for measuring wheel alignment comprising:
at least one camera mounted to a frame offset from a surface upon which a test wheel rotates about a z-axis, wherein the at least one camera captures at least one image of the test wheel; and
at least one processor in communication with the camera, the at least one processor being configured
to locate an outer curve in the at least one image based on a difference of reflectivity on surfaces of the test wheel;
to locate a perspective center for the outer curve;
to locate the z-axis in the at least one image; and
to measure Rx and Ry for the test wheel based on comparing the perspective center to the z-axis,
wherein the processor is configured to locate an inner curve in the at least one image based on a difference of reflectivity on surfaces of the test wheel, and wherein the processor is configured to locate a centrally-located opening in a wheel rim, wherein the inner curve coincides with the centrally-located opening.

13. The system of claim 12, wherein the inner curve is a circle having a radius emanating from the z-axis.

* * * * *